United States Patent
Bünger Von Wurmb

(10) Patent No.: US 12,502,307 B2
(45) Date of Patent: Dec. 23, 2025

(54) DEVICE FOR THE TREATMENT OF HERPES DISEASES

(71) Applicant: DERMAPHARM AG, Grünwald (DE)

(72) Inventor: Daniel Bünger Von Wurmb, Mönchengladbach (DE)

(73) Assignee: DERMAPHARM AG, Grünwald (DE)

( * ) Notice: Subject to any disclaimer, the term of this patent is extended or adjusted under 35 U.S.C. 154(b) by 735 days.

(21) Appl. No.: 17/273,011

(22) PCT Filed: Sep. 5, 2019

(86) PCT No.: PCT/EP2019/073632
§ 371 (c)(1),
(2) Date: Mar. 3, 2021

(87) PCT Pub. No.: WO2020/049071
PCT Pub. Date: Mar. 12, 2020

(65) Prior Publication Data
US 2021/0322204 A1 Oct. 21, 2021

(30) Foreign Application Priority Data

Sep. 5, 2018 (EP) .................................. 18192693
Sep. 5, 2018 (EP) .................................. 18192698

(51) Int. Cl.
*A61F 7/00* (2006.01)
*A61F 7/02* (2006.01)

(52) U.S. Cl.
CPC ................ *A61F 7/007* (2013.01); *A61F 7/02* (2013.01); *A61F 2007/0003* (2013.01); *A61F 2007/0017* (2013.01); *A61F 2007/0052* (2013.01); *A61F 2007/0073* (2013.01); *A61F 2007/0078* (2013.01); *A61F 2007/0086* (2013.01); *A61F 2007/0087* (2013.01); *A61F 2007/0093* (2013.01); *A61F 2007/0096* (2013.01); *A61F 2007/0284* (2013.01)

(58) Field of Classification Search
CPC .... A61F 7/007; A61F 7/02; A61F 2007/0003; A61F 2007/0017; A61F 2007/0052; A61F 2007/0073; A61F 2007/0078; A61F 2007/0086; A61F 2007/0087; A61F 2007/0093; A61F 2007/0096; A61F 2007/0284

See application file for complete search history.

(56) References Cited

U.S. PATENT DOCUMENTS

| | | | | |
|---|---|---|---|---|
| 2001/0008974 A1* | 7/2001 | Li | ............................ | A61F 7/007 607/96 |
| 2004/0243181 A1* | 12/2004 | Conrad | ................... | A61P 17/00 607/1 |
| 2007/0049998 A1* | 3/2007 | Conrad | ................... | A61F 7/007 607/96 |
| 2009/0264971 A1* | 10/2009 | Wickstead | ................ | A61F 7/03 607/108 |
| 2010/0179623 A1* | 7/2010 | Hofer | ..................... | A61F 7/007 607/96 |
| 2011/0015549 A1* | 1/2011 | Eckhouse | ............... | A61F 7/007 601/3 |
| 2011/0172750 A1* | 7/2011 | Cassidy | .................... | A61F 7/02 607/108 |
| 2014/0352325 A1* | 12/2014 | Brown | .................... | F25B 21/04 62/3.2 |
| 2019/0290531 A1* | 9/2019 | Bosma | ..................... | A61H 7/00 |
| 2020/0129324 A1* | 4/2020 | Reuter | .................... | A61F 7/007 |

FOREIGN PATENT DOCUMENTS

| | | | | |
|---|---|---|---|---|
| EP | 1231875 B1 * | 9/2004 | ............ | A61F 7/007 |
| WO | WO-2015092587 A2 * | 6/2015 | ........... | A61B 5/0055 |

OTHER PUBLICATIONS

Enderlein, Dietmar, Translation of EP 1231875, 2004 (Year: 2004).*
Kruppa, Rainer, Translation of EP-1231875-B1, 2004 (Year: 2004).*

* cited by examiner

*Primary Examiner* — Adam Z Minchella
(74) *Attorney, Agent, or Firm* — Maschoff Brennan

(57) ABSTRACT

The invention relates a device for the hyperthermal treatment of a herpes disease on a skin, preferably a lip, wherein a control device is configured to regulate a treatment surface on an outer side facing the skin by heating at least one heating element in a heating phase to a contact temperature of 43-47° C. during a contact of the treatment surface with the skin, preferably the lip, and to maintain the contact temperature in a treatment phase for a time period between 1 and 10 seconds.

19 Claims, No Drawings

DEVICE FOR THE TREATMENT OF HERPES DISEASES

The invention relates a device for the hyperthermal treatment of a herpes disease on a skin, preferably a lip, wherein a control device is configured to regulate a treatment surface on an outer side facing the skin by heating at least one heating element in a heating phase to a contact temperature of 43-47° C. during a contact of the treatment surface with the skin, preferably the lip, and to maintain the contact temperature in a treatment phase for a time period between 1 and 10 seconds.

BACKGROUND AND STATE OF THE ART

Herpes is commonly known as an acute, primary or secondary viral disease of the skin and mucous membranes caused by infection with the herpes virus. It usually occurs as locally grouped vesicles, especially in the face (Herpes *facialis*), on the cheeks (Herpes *buccalis*), on the nose (Herpes *nasalis*) and on the genital organs (Herpes *genitalis*). The initial infection often occurs in early childhood and without being detected, but leads to the formation of antibodies and often to masking of the virus and colonization of body tissues, which leads to relapses in virus carriers with weak states of the immune system. For the soothing treatment of pain and itching in recurrent herpes *labialis*, lip herpes creams are used, e.g. with the active ingredient Aciclovir. These creams should be used at the first signs of herpes (burning, itching, tension and redness) as they inhibit the growth of certain viruses (anti-viral, anti-viral DNA polymerase inhibitor). The duration of treatment is generally 5 days.

The disadvantage of such creams is that side effects and intolerances may occur or the hoped-for effects may not occur in whole or in part.

From DE 102005002946 A1 a device for the treatment of herpes diseases is known. The device comprises a heating plate with a preferred size of 20 mm², which is heated to 49° C.-53° C. for a treatment duration of preferably 10-15 sec. Similarly, WO 2018/011262 A1, EP 3 269 340 A1 and WO 2018/011263 A1 also provide hyperthermal treatment of herpes diseases, with WO 2018/011263 A1 suggesting preferred ranges of 49-53° C. for a time period of 10-15 seconds.

During the treatment period, the heating plate contacts the affected skin area of the lips, for example the reddened area or the position where bubbles have already formed. The heat application leads on the one hand to a containment of the multiplication of the causative pathogens by a neutralizing effect on the herpes simplex viruses. On the other hand, the short-term heat treatment causes the itching of the herpes disease to be masked by the stimulation of temperature-sensitive nerves.

When heating the heating plates in the mentioned parameter ranges, subjective temperature fluctuations and a strong perception of pain may occur, especially when applied to the lips. Since the skin on the lips is known to be thinner and has fewer cell layers, thermal stress can more easily cause physiological damage. The sensitivity to pain of the lips is because of this also higher. This can lead to the subjects terminating the treatment and reducing the success of the therapy. WO 2006/125092 A2 reveals a device for the local treatment of skin disorders, including herpes, by means of a heat application. The focus of WO 2006/125092 A2 is to provide a replaceable cap for the device. The preferred temperature ranges for the treatment of skin disorders include 48°-53° C., wherein the temperature is preferably maintained for at least 30 seconds.

U.S. Pat. No. 6,245,093 B1 relates to a device for the treatment of itching by means of heat. Treatment temperatures are disclosed for itching in a wide range of 46° C. and 62° C., without disclosing optimized parameters or an optimized control of temperature parameters for a herpes treatment.

WO 2007/082648 A1 describes a device for the treatment of insect bites by heat application. The device has a flat body as a contact surface, which can be made of ceramics or gold. The temperature is passively regulated via a temperature-dependent resistor and a manual switch for starting and terminating the treatment, preferably in a range of 50° C.-65° C.

From WO 01/34074 A1 a hyperthermal treatment device for insect bites is known, wherein preferred treatment temperatures of 50-65° C. are maintained for a treatment duration of 2-12 sec.

Also in the case of other known hyperthermal devices a heating of the heating plates in the parameter ranges mentioned, especially when applied to sensitive lips for the treatment of herpes, can lead to subjectively perceived temperature fluctuations and a strong perception of pain, such that treatments are terminated more frequently, resulting in reduced treatment success.

OBJECTIVE OF THE INVENTION

An objective of the invention was to provide a device that eliminates the disadvantages of the prior art. In particular, a device is to be provided which is suitable for the treatment of herpes, preferably lip herpes, and which is characterized by increased effectiveness, ease of use and associated compliance.

SUMMARY OF THE INVENTION

The objective of the invention is solved by a device according to the independent claim. The dependent claims relate to preferred embodiments of the invention.

In a preferred embodiment, the invention thus relates a device for the hyperthermal treatment of a herpes disease on a skin, preferably a lip, comprising
 (a) at least one treatment surface with a maximum size of 60 mm²; and
 (b) a device for regulating the temperature of the treatment surface,
characterized in that the control device is configured to regulate the outer side of the treatment surface by heating at least one heating element in a heating phase to a contact temperature of 43° C.-47° C. during a contact of the treatment surface with the skin, preferably the lip, and to maintain the contact temperature in a treatment phase for a time period of between 1 and 10 seconds.

In the sense of the invention, the term "hyperthermal treatment of a herpes treatment on the skin" is preferably used to describe a treatment of herpes diseases, preferably herpes *labiales*, which alleviates the symptoms of herpes and treats the disease or inhibits its progression by applying a defined amount of heat.

The treatment of herpes diseases therefore particularly also concerns the treatment of redness, swelling, itching or other symptoms associated with herpes, in particular lip herpes.

In order to carry out a hyperthermal treatment, the control device according to the invention ensures that the treatment surface is guided to a contact temperature of 43° C.-47° C. by heating at least one heating element during a contact of the treatment surface with the skin, preferably the lip. In the sense of the invention, the contact temperature refers to the temperature which the treatment surface exhibits on an outer side facing the skin, while the outer side is in contact with the skin area, preferably with a lip area. According to the invention, a distinction is therefore made between a contact temperature and a non-contact temperature of the treatment surface. Here, the non-contact temperature corresponds to the temperature of the treatment surface if it does not contact the skin or lip but, for example, without a thermal load only contacts air.

In known hyperthermal devices, the temperature of the treatment surface is usually regulated by a heating element based on a non-contact temperature. This means that the parameters of the control devices are determined on the basis of standardized measurements of a temperature curve without thermal load. Such a regulation does not necessarily differentiate between a regulation of the temperature of the treatment surface on the side facing the skin or facing away from the skin.

The inventors realized that such regulation is not sufficiently precise, especially in the treatment of herpes in sensitive areas such as the lips. This can lead to fluctuations and subjectively perceived pain, which leads to a reduced compliance of the subjects (willingness of the subjects to actively participate) and thus to successful therapy. Due to the thinner skin, physiological damage to the lips also occurs more easily. The sensitivity to pain is also higher because of this.

The device according to the invention, on the other hand, is characterized by the fact that the contact temperature is kept within a narrow range of 43° C.-47° C., preferably 44.5° C.-46.5° C., particularly preferably 45° C.-46° C., which is therapeutically effective for herpes.

In the sense of the invention the outer side of the treatment surface refers to the side of the treatment surface that is accessible from the outside of the device and thus corresponds to the side that faces the skin, when the device is used. The use of the term "an outer side of the treatment surface facing the skin" is predominantly explanatory. For a hyperthermal device, an outer and inner side of the treatment surface will always be defined. The inner side preferably refers to the side facing away from the skin. In the case of a housing it will be preferred that the treatment surface is integrated into the housing surface, whereby the inside, in contrast to the outside, is not accessible or visible from the outside.

To adjust the precise contact temperature, the device can have temperature sensors that measure the temperature of the treatment surface during contact with the skin, preferably the lip, and regulate the heating elements accordingly. In cases where a temperature sensor does not measure the temperature of the treatment surface directly on the outside facing the skin, for example because it is installed on the inner side of a treatment surface, the target temperature of the control device for the measured value of the temperature sensor can be adjusted so that the contact temperature is kept precisely within the specified range. For example, a correspondingly higher target temperature can be set on the basis of experimental tests or calculations of the heat flow. This ensures that the contact temperature is maintained when the treatment surface comes into contact with the skin, preferably the lip. Advantageously, experiments have shown that a person's skin, especially lips, has similar thermal properties across different subjects, so that the experimental or theoretical results are reliably transferable. It has also been shown in particular that the thermal properties of different extremities of a subject often differ more than the same extremities of different subject, so that the thermal properties can be used to determine the contact temperature.

During the cycle of a hyperthermal treatment, the outer side of the treatment surface facing the skin is first heated up to the contact temperature. It is preferable that the heating phase does not require a longer period of time. Preferably, the heating-up phase should not exceed 10 s, especially preferred not more than 3 s. Excellent results were achieved with heating times of 1-3 seconds. Following the heating phase, the contact temperature is maintained in the range of 43° C.-47° C., preferably 44.5° C.-46.5° C., particularly preferred 45° C.-46° C., for the duration of the treatment phase. It may be preferable for the contact temperature to be constant during the treatment phase. However, it may also be preferable for the contact temperature to vary within the specified limits during the treatment phase.

In the sense of the invention, the treatment phase preferably refers to a continuous period of time during which the control device maintains the skin-facing side of the treatment surface at a contact temperature in the specified range of 43° C.-47° C., preferably 44.5° C.-46.5° C., particularly preferably 45° C.-46° C. Before the treatment phase, i.e. during the heating phase, the contact temperature is below said values. After the end of the treatment phase, the control device preferably no longer heats the at least one heating element, such that the contact temperature falls below the range of 43° C.-47° C., preferably 44.5° C.-46.5° C., particularly preferably 45° C.-46° C.

By regulating the outer side of the treatment surface to a contact temperature of 43° C.-47° C., preferably 44.5° C.-46.5° C., particularly preferred 45° C.-46° C. for a treatment phase of between 1 s and 10 s, preferably between 2 s and 5 s, a defined amount of heat is applied to the skin area in a controlled manner. The defined heat pulse leads to a surprisingly effective therapy of herpes diseases, especially lip herpes, without unpleasant pain or even burns.

Studies have shown that the risk of combustion at a temperature level of 44° C. to 51° increases by a factor of two with each degree Celsius. Test persons also report that from a temperature of 47.5° C. to 48.5° C. heat is perceived on a skin, especially on lips, in the form of stabbing pain. Below 47° C. the temperature appears much more bearable.

In contrast, it was realized that the thermolability of the DNA-binding protein ICP8 can be exploited to effectively prevent replication of the herpes virus DNA. Studies have shown a reduction in the binding activity of the protein to the virus DNA of about 50% at a temperature of 45° C.

In particular, it was realized that a particularly strong overlapping of the itching sensation can be achieved if the thermo- and capsaicin receptor TRPV1 is activated locally in the relevant skin areas. TRPV1 is involved in acute heat-induced pain in healthy skin and regulates heat sensation at temperatures around 45° C. to 50° C., for example. Activation of TRPV 1 additionally suppresses the sensation of tension and itching and thus the accompanying symptoms of herpes disease.

On the one hand, a temperature as high as possible should be chosen for the application of heat against herpes, on the other hand, a pain associated with this can lead to the premature discontinuation of the treatment, such that the treatment is not successful.

By precisely regulating the contact temperature within a range of 43° C.-47° C. for the treatment phase of 1-10 s in accordance with the invention, very good results could be achieved with regard to a reduction of the herpes blisters within a few days without any complaints of stabbing pain. Compliance and therapy success were consistently good for the device according to the invention.

Excellent results have been achieved with a preferred embodiment of the device, wherein the contact temperature is between 44.5° C.-46.5° C., particularly preferred between 45° C.-46° C. For the aforementioned temperature ranges, studies were able to partially avoid a symptomatic outbreak of herpes and/or, in an advanced stage, to observe a visible and/or palpable decay of the herpes vesicles and redness within 2 days, at ties within one day. This suggests that the above ranges represent an optimal treatment regime. The high therapeutic success of the treatment regime can only partly be explained by the above described thermolability of the DNA-binding protein of the herpes virus. At the same time, the body's own immune system appears to be supported for the temperature ranges of 44.5° C.-46.5° C., especially 45° C.-46° C., so that a synergistic effect is responsible for the treatment success for said narrow temperature range, which includes an inhibition of the replication of the herpes viruses and simultaneous activation or support of the body's own immune system.

In addition, subjects reported significantly reduced itching for the preferred contact temperatures of 44.5° C.-46.5° C., particularly preferred between 45° C.-46° C. Surprisingly, the lessening of itching lasted for hours after the treatment. As secondary treatment effect a reduced scratching of the herpes blister is observed, which also contributes to faster healing.

In the sense of the invention, the treatment surface preferably refers to a material surface of the device which is in direct thermal contact with the skin during a treatment.

The treatment surface can be a connected surface. It may also be preferred that the treatment surface consists of several non-connected partial areas. The size of the treatment surface preferably refers to the total contact surface over which a part of the skin experiences a thermal impulse. In the case of a treatment surface consisting of several partial surfaces, the size of the treatment surface preferably corresponds to the sum of the individual partial surfaces. Such a division into partial surfaces can be advantageous for certain manifestations of herpes, as well as for the treatment of certain parts of the body.

In the treatment of herpes, the treatment surface is preferably a maximum of 60 mm$^2$. The size of the treatment surface between 20 mm$^2$ and 50 mm$^2$ is particularly preferred. The size of the treatment surface selected in this way allows the treatment to be optimally adapted to the cause, optimizing therapeutic efficiency and thus contributing to a more sustainable treatment success. It is particularly preferred to choose circular treatment surfaces.

It is preferred that the treatment surface is brought to the desired contact temperature with the aid of at least one heating element. In a preferred embodiment, the treatment surface corresponds to the surface of a heating plate, which is heated with the aid of a heating element, wherein, for example, a semiconductor component can be used. However, the treatment surface can also designate a homogeneous material surface, which is tempered by several heating elements. For example, it may be preferable to use two or four heating elements in order to guide the treatment surface particularly homogeneously and quickly to the contact temperature. It may also be preferable to coat a heating plate comprising a heating element. In this case, the treatment surface is preferably understood as the coating of the heating plate, so that the contact temperature always indicates the temperature which is present on the side of the treatment surface facing the skin during a contact of the treatment surface with the skin.

For the purpose of the invention, the control device is preferably a processor, processor chip, microprocessor or microcontroller which is configured to regulate the temperature of the treatment surface by means of at least one heating element in accordance with predetermined values for the contact temperature.

Preferably the term the heating element refers to the component which can be heated by the control device, for example by applying an electric current. The at least one heating element is a component for which various embodiments are sufficiently known in the state of the art. The heating element may comprise a power resistor in which a well-defined temperature is generated, depending on the current flow. A field effect transistor (FET) can preferably be used for quantitatively controlling the current flow through the heating element. However, it may also be preferable to use a FET itself as a heating element. Here, energy dissipation in the transistor itself is used to generate heat and bring the treatment surface to the contact temperature. FETs are particularly preferred as heating elements, as they allow a low size of the device due to their small dimensions. Furthermore, FETs are particularly reactive and ensure a particularly rapid response behavior of the heating elements due to a very dynamic heat generation and heat release.

Preferably, the control device by presetting the current feed to the heating element, can control which contact temperature is present. For example, a calibration can be used to determine the correlation between current flow and/or voltage at the heating element and the contact temperature during contact of the treatment surface with the skin, so that a desired contact temperature between 43° C. and 47° C., preferably between 44.5° C.-46.5° C., particularly preferred between 45° C.-46° C., can be reliably set on the basis of the calibration.

However, it may also be preferable to regulate the contact temperature through the control device using a feedback loop. For example, it may be preferable to use a temperature sensor which measures a temperature at a position on the treatment surface, wherein the control device regulates the current supply to the heating element on the basis of the temperature data. For this purpose, the control device may include, for example, a microprocessor.

In the sense of the invention a microprocessor is preferably understood as a data processing device, i.e. a processor, which is characterized by small dimensions in the range of a few mm and wherein preferably all components of the processor are present on a microchip or an integrated circuit (IC). The microprocessor can be preferably also a microcontroller, which integrates further peripheral elements on the microchip besides the processor and comprises for example also a data memory.

It is further preferred for the microprocessor to be installed on a printed circuit board (PCB). In addition to the microprocessor, the PCB preferably also has the heating elements and temperature sensors installed on it. This preferred embodiment allows for an extremely compact and robust construction of the device and a particularly intelligent temperature regulation using the microprocessor. Thus the microprocessor is not only able to evaluate the measured temperature data and translate them into a control of the heating element, but also it can rapidly and reliably take additional parameters such as error messages and user input into consideration.

In a preferred embodiment of the invention, the device is characterized in that the microprocessor and the heating element and optionally a temperature sensor are installed on a printed circuit board (PCB), wherein at least the heating element and the temperature sensor are coated with a protective lacquer. In the sense of the invention, the protective lacquer is preferably understood as a lacquer or a paint intended to protect components of the PCB from environmental influences.

For this purpose, the protective lacquer is preferably electrically insulating and water-resistant. The property of electrical insulation can preferably be quantified by the surface insulation resistance (SIR). The SIR can preferably be measured, for example, by leakage currents between components of the printed circuit board. A high resistance corresponds to good electrical insulation. Water resistant means preferentially that even with at high humidity conditions or in case of water penetration, the lacquered electronic components remain intact and no short circuiting occurs. Water resistance, for example, can also be tested by measuring the SIR under conditions of high atmospheric humidity.

Numerous protective lacquers preferentially suitable for use are known in the prior art. Examples include protective lacquers based on acrylate, silicone or polyurethane. By applying the protective lacquer in the area of the heating elements and temperature sensors, these are effectively protected against deposits so that incorrect measurements of the temperature sensors can be avoided. On one hand, this increases the accuracy with which the contact temperature can be set and, on the other hand, it prevents overheating of the treatment surface due to an incorrect measurement of the temperature.

In a preferred embodiment of the invention, the heating phase is 1 second to 5 seconds, preferably less than 3 seconds and in particular 1 to 2 seconds. The desired temperature can be reached particularly fast by such a fast heating phase. Thus, healing effects can be achieved without unnecessarily applying heat to the user and/or increasing the effective time required for treatment. In addition, the amount of heat applied during the treatment can be determined with a particular high precision.

Due to the targeted and significantly faster heating phase than common with state-of-the-art devices, a particularly high acceptance of the subjects and thus reliable therapy success can be achieved. Advantageously, it is avoided that the lips of the test persons are unnecessarily irritated during a therapeutically ineffective heating phase. Instead, the therapeutically effective contact temperature for herpes treatment of 43° C.-47° C., preferably 44.5° C.-46.5° C., especially preferred 45° C.-46° C., is reached quickly and reliably.

Preferably, the heating phase indicates the duration during which the outer side of the treatment surface is brought to a contact temperature of 43° C.-47° C. by heating at least one heating element during contact with the skin, preferably the lip. Due to the low thermal load of a treatment surface, an initial temperature of the treatment surface, which corresponds to the typical skin temperature of the lips (e.g. 32° C.), will usually be reached relatively quickly when the device is applied to the lip. The heating phase therefore preferentially indicates the duration of the temperature rise from a natural body skin temperature to the desired contact temperature of 43° C.-47° C., preferred from 44.5° C.-46.5° C., particularly preferred from 45° C.-46° C., during the treatment phase In a particularly preferred embodiment of the invention the size of the treatment surface is between 30 mm$^2$ and 50 mm$^2$, the contact temperature is between 44.5° C.-46.5° C., preferably between 45° C.-46° C., wherein the control device can maintain the contact temperature for a time period between 2 and 5 seconds.

The most successful treatments of herpes were achieved with a contact temperature of 44.5° C.-46.5° C., preferably 45° C., 46° C., with a maximum heat release area of 60 mm$^2$, preferably between 20 and 50 mm$^2$, and a treatment phase of 1-10 s, preferably 2-5 s.

It has also proven to be particularly beneficial for these embodiments to ensure short heating phases from 1 second to 5 seconds, preferably less than 3 seconds and in particular 1 to 2 seconds.

In a particularly preferred embodiment of the invention, the size of the treatment surface is between 30 mm$^2$ and 50 mm$^2$, the control device regulates the outer side of the treatment surface by heating at least one heating element during a heating phase from 1 second to 5 seconds, preferably less than 3 seconds and in particular 1 to 2 seconds, to a contact temperature between 44.5° C.-46.5° C., preferably between 45° C.-46° C., the control device being configured to maintain the contact temperature for a time period between 2 and 5 seconds.

In case of herpes diseases, especially in the mouth (so-called herpes *labialis*), the preferred maximum treatment surface size of 60 mm$^2$ is ideal to cover all possible affected areas. In particular, a treatment surface between 20 and 50 mm$^2$ is suitable to cover all typical affected skin areas with only one application of the device. Furthermore, a herpes treatment device having such a treatment surface can be kept particularly compact. In this way, device sizes corresponding to those of a lipstick can be achieved. Such a compact device is often and gladly worn permanently on the body or in a bag so that a treatment can be carried out at any time. This significantly increases the treatment success. The treatment surface is preferably round; this is particularly suitable for the treatment of herpes, wherein the affected skin areas often exhibit nearly round shape.

It is also possible to use arbitrary three-dimensional shapes, especially convex shapes, which are particularly suited for the treatment of herpes. For example, the shape of a lipstick can be used, encouraging the user to gently pressing the device during treatment. Hereby, a psychological effect can be triggered that enhances the well-being during treatment. The amount of heat transferred may also be improved. An organic form can be used, which is particularly suitable for the treatment of the lips.

In addition, it has been shown that a combination of the size of the treatment surface together with the preferred contact temperatures and treatment phase is particularly effective in treating herpes, especially on lip areas. On one hand, the treatment surface is large enough to effectively cover adjacent areas and thus also effectively treat the border area of infected skin areas. On the other hand, despite the hyperthermal treatment, the maximum size of the treatment surface is perceived as particularly pleasant without any painful sensations. This is of particular significance in sensitive area of the mouth, especially the lips. For test persons with the aforementioned parameters, both the best compliance values, i.e. the highest willingness of the patients to actively participate and use the device, and the the most successful therapies are observed.

In a preferred embodiment of the invention, the device comprises at least one temperature sensor for measuring the temperature of the treatment surface, wherein the control device regulates the at least one heating element based on the measurement data of the temperature sensor.

In the sense of the invention, a temperature sensor is preferably an electrical or electronic component which generates an electrical signal depending on the temperature present at the sensor. In the state of the art, a large number of temperature sensors are known such as semiconductor temperature sensors, resistance temperature sensors, pyroelectric materials, thermocouples or oscillating quartz crystals.

The control device is also preferably configured in such a way that it can record and process the measured values of the temperature sensors in order to effect control of the heating element(s). The heating elements can preferably be regulated by means of applying an electric current or a voltage. It is particularly preferred that the temperature sensor measures the temperature of the treatment surface directly, i.e. that the temperature sensor is in contact with the treatment surface, wherein the temperature sensor can be located both on the inner side of the treatment surface and on the outer side of the treatment surface or be the temperature sensor may be presently installed within the treatment surface.

The control device is configured to reliably set the contact temperature based on the temperature measured by the temperature sensor. For example, if the temperature sensor is mounted on the inner side of the treatment surface, the control device will be configured to set the target temperature on the inner sided of the treatment surface to a higher temperature than is desired on the relevant outer side of the treatment surface during a contact. The difference between such a target temperature and the contact temperature to be achieved can be provided to the control device as reference data on the basis of theoretical predictions on the heat flow within the treatment surface, when applied to a skin, or on the basis of calibration measurements.

However, it can also be preferred that the temperature sensor does not directly contact and monitor the treatment surface, but instead, the heating elements or a material point between the heating elements and the treatment surface. In the case of several heating elements heating the treatment surface, it may also be preferable to place the temperature sensor between the heating elements. Likewise, a conclusion may be drawn regarding the temperature of the treatment surface from the measurement data for the temperature via the heating elements or a measurement point at a certain distance from the treatment surface.

The contact temperature preferentially refers to the average temperature of the outer side of the treatment surface, while it contacts a skin during the application of the device.

Evaluation of the temperature of the treatment surface allows a particularly precise regulation of the at least one heating element in order to ensure an optimal temperature distribution on the outer side of the treatment surface and thus the heat transfer to the skin areas to be treated. Especially with regard to the use of the device for sensitive skin areas, such as lip herpes, the embodiment is characterized by a more targeted and controlled regulation.

In a further preferred embodiment of the invention, the device is characterized in that the treatment surface consists of a material having a thermal conductivity at 45° C. between 20 W/m K and 400 W/m K, preferably between 100 and 350 W/m K. Thermal conductivity (also known as the heat transfer coefficient) characterizes preferably the thermal properties of the material from which the treatment surface is made. The thermal conductivity indicates the quantity of heat that is conducted through the treatment surface when a temperature gradient is applied to it.

In addition to thermal conductivity, the heat transport depends on the thickness of the treatment surface, the size of the treatment surface and the temperature difference between the inner side of the treatment surface (contact with heating elements) and the outer side of the treatment surface (contact with skin). The thermal conductivity is preferably given as the ratio of the transported heat output Watt (W) per temperature difference in Kelvin (K) and per meter (m). Since the thermal conductivity can change slightly depending on the temperature, the reference temperature of 45° C. is given here.

The thickness of the treatment surface also indicates the preferred extension of the treatment surface between the outermost surface which contacts the skin and the innermost surface contacting the heating elements. In some embodiments, the thickness of the treatment surface can be in between 0.2 mm and 5 mm, preferably in between 0.5 mm and 2 mm.

In a preferred embodiment, the treatment surface includes ceramic or gold. It is particularly preferred that the treatment surface be made of gold or ceramic. The materials ceramics and gold fall on one hand into experimentally determined, preferred areas of thermal conductivity.

In addition, both ceramics and gold are surprisingly well suited for the treatment of herpes. In particular, the materials convey an increased sensation of a pain masking in in the patients. This is surprising in so far that effect can go beyond the pure temperature effect of thermally comparable materials.

Furthermore, gold and especially ceramics are characterized by a surprisingly high biological compatibility, which, paired with a particularly low level of allergies to these materials, distinguishes the materials for an application in a device for the treatment of predominantly dermatological diseases.

A particularly preferred ceramic is aluminum nitride. To an especially large extent this is characterized by exceptional biological tolerance and excellent thermal properties. In addition, a treatment surface made of aluminum nitride is especially strongly electrically insulated, so that increased safety can be assured during use. This is particularly advantageous in conjunction with the use of a protective coating and leads to a synergistic increase in safety.

The advantage of using ceramics and in particular aluminum nitride is further apparent in that the treatment surface can be readily disinfected with a disinfectant without deterioration of the surface, thus achieving an antimicrobial effect with the above-mentioned advantages. Due to the increased safety when using protective lacquer in combination with a treatment surface made of ceramic and especially aluminum nitrite, liquid disinfectants can be used safely and without problems.

However, disinfectants can also be used on a gold surface.

The use of disinfectants to disinfect a treatment surface or even the entire device is recommendable, especially for a device used to treat herpes disease, since herpes is known to be extremely contagious and a device can only be used by more than one person in case of a thorough disinfection.

In a preferred embodiment the device is characterized in that the temperature sensor is present on the inner side of the treatment surface and the treatment surface is formed by a ceramic layer with a layer thickness between 50 µm and 2000 µm, preferably between 50 µm and 1500 µm and particularly preferably 50 µm and 1000 µm or also 50 µm and 500 µm. Intermediate ranges from the aforementioned ranges can also be preferred, such as 50 µm to 100 µm, 100 µm to 200 µm, 200 µm to 300 µm, 300 µm to 400 µm, 400

µm to 500 µm, 600 µm to 700 µm, 700 µm to 800 µm, 800 µm to 900 µm, 900 µm to 1000 µm, 1000 to 1100 µm, 1100 to 1200 µm, 1300 to 1400 µm, 1400 µm to 1500 µm, 1600 µm to 1700 µm, 1700 µm to 1800 µm, 1800 µm to 1900 µm or even 1900 µm to 2000 µm. A person skilled in the art realizes that the above-mentioned limits can also be combined to obtain further preferred ranges, such as 200 µm to 800 µm, 100 µm to 400 µm or even 100 µm to 1000 µm.

In a preferred embodiment the device is characterized in that the temperature sensor is present on the inner side of the treatment surface and the treatment surface is formed by a gold layer with a layer thickness between 5 µm and 2000 µm, preferably between 50 µm and 1500 µm and in particular between 50 µm and 1000 µm or also between 50 µm and 500 µm. Intermediate ranges from the aforementioned ranges can also be preferred, such as 50 µm to 100 µm, 100 µm to 200 µm, 200 µm to 300 µm, 300 µm to 400 µm, 400 µm to 500 µm, 600 µm to 700 µm, 700 µm to 800 µm, 800 µm to 900 µm, 900 µm to 1000 µm, 1000 to 1100 µm, 1100 to 1200 µm, 1300 to 1400 µm, 1400 µm to 1500 µm, 1600 µm to 1700 µm, 1700 µm to 1800 µm, 1800 µm to 1900 µm or 1900 µm to 2000 µm. A person skilled in the art recognizes that the aforementioned limits can also be combined to obtain further preferred ranges, such as 200 µm to 800 µm, 100 µm to 400 µm or even 100 µm to 1000 µm.

Due to the aforementioned preferred layer thicknesses, especially for the use of gold or ceramics, it is possible to adjust the contact temperature very precisely during the application of the device and to maintain it within a narrow temperature range. While with thicker treatment surfaces, it is possible to draw conclusions about the contact temperature based on calibration curves or theoretical calculations on the basis of a temperature measurement on the inner side of the treatment surface. The above-mentioned layer thicknesses of preferably less than 2000 µm, less than 1500 µm and less than 1000 µm, in some cases less than 500 µm, however, minimize sources of error due to tolerances in manufacturing or changes in the device (moisture, wear etc.) which can lead to altered heat flow patterns within the treatment surface.

By implementing the temperature sensors on the inner side at a maximal distance of 1000 µm, preferably at a maximal distance of 500 µm, 200 µm or less below the outer side of the treatment surface a reliable measurement of the contact temperature can be made. In the context of feedback regulation, the target temperature for the temperature sensor on the inner side will deviate only slightly from the target contact temperature, whereby interference factors can be eliminated to a far extent The aforementioned thin treatment layers thus permit a particular precise regulation of the contact temperature to especially preferred values of 44.5 to 46.5° C., preferably 45° C.-46° C. In addition, especially small tolerances of less than 1° C., preferably less than 0.5° C., 0.4° C., 0.3° C., 0.2° C. or 0.1° can be achieved. In addition, it is advantageous that by means of such thin layers of the treatment surface the heating phase can be maintained particularly reliable within the short preferred ranges of 1 second to 5 seconds, less than 3 seconds or 1 to 2 seconds.

Moreover, as a result of using thin layers and a low thermal load delays can be avoided. Also, a reduced heating power is necessary to set the desired contact temperature, such that the risk of overshooting, i.e. a brief rise to a contact temperature above the desired range, for example from 44.5 to 46.5° C., preferably 45° C.-46° C., is avoided.

In further preferred embodiment of the invention, the device is characterized in that the treatment surface is formed by a ceramic and the temperature sensor is integrated into the treatment surface. Advantageously for this embodiment, the temperature sensor can be brought extremely close to the outer side facing the skin, irrespective of the thickness of the layer of the treatment surface.

The embodiment is therefore characterized by an additional degree of design freedom with regard to the layer thickness, with an equally precise regulation of the contact temperature. For example, it may be preferred to use a ceramic treatment surface with a layer thickness of 0.5 to 2 mm, wherein the temperature sensor is integrated as a thin-film sensor within the treatment surface. In contrast to known measuring methods in the context of a hyperthermal treatment, this allows a particularly precise knowledge of the heat flow during a treatment.

In a further preferred embodiment of the invention, the device comprises at least one contact sensor. In the sense of the invention, the contact sensor refers to a unit which, on the basis of measurement data and their analysis, can make a statement as to whether the treatment surface is in contact with a skin, preferably a lip, or not. The contact sensor preferably comprises a sensor or a measuring unit connected to the control device, wherein the control device may process the measurement data.

For example, the contact sensor can include an optical sensor that transmits measurement data on the lighting conditions to the control unit. If the optical sensor is close to or installed within the treatment surface, a decrease in brightness indicates that the treatment surface contacts a skin. However, it may also be preferable for a contact sensor to designate a unit consisting of a temperature sensor and the control device for regulating the heating elements, wherein the contact sensor may draw conclusions about the presence of a skin contact on the basis of the correlation between an electrical current and the actual temperature.

It goes without saying that contact sensors in the sense of the invention can only make statements of probability about the contacting of a skin on the basis of measurable parameters, which distinguish a skin especially in contrast to air. This may concern, for example, thermal properties of skin such as its thermal load, electrical properties of skin such as its conductivity and/or optical properties such as its opacity. Preferably, the detection of a contact with the skin is in this sense to be understood as a measurement-based statement for a likely contacting of a skin, in contrast to a condition in which the treatment surface contacts air.

By means of the contact sensor and the information about the time at which the treatment surface contacts the skin, a particularly precise regulation of the heat flow for the treatment of herpes can be achieved. For example, the beginning of the heating phase can be made dependent on whether there is contact with the skin. The time period of the treatment phase can also be reliably recorded in order to monitor treatments that have been carried out and, if necessary, adapt further applications accordingly. The contact sensor also allows for an improved control with regard to safety aspects. With the help of a contact sensor, it can be avoided that the treatment surface heats up without the user's intent or knowledge.

By means of a contact sensor, for example, an accidental triggering of a heating process can be reliably avoided, even if the device is carried in a trouser pocket. The use of a contact sensor is particularly advantageous for a flexible transport of mobile devices for the treatment of itching or herpes. By using a contact sensor, a particularly energy-efficient operation is possible, in which a heating is only triggered, if the contact sensor actually rests on a skin. In addition, unintentional and dangerous heating, for example in a trouser pocket or next to sensitive devices, such as a smartphones with a plastic component, etc., will be avoided.

In addition, it has been shown that a therapeutically effective temperature curve of the contact temperature can be achieved with particular precision by means of a contact sensor. Based on the information of a contact sensor, a contact temperature of 43-47° C., preferably 44.5° C. to 45.5° C., especially preferably 45° C. to 46° C. can be precisely set on the basis of information provided by the contact sensor within short heating phases of preferably 1 to 5 seconds, preferably less than 3 seconds, especially preferred 1-2 seconds,.

The information as to whether or not a contact is established with the skin can be used efficiently to avoid a potential overshooting of the temperature of the treatment surface beyond the predetermined range. Instead, a focused hyperthermal treatment is carried out only after an actual contact with the skin is established and only during said contact. Temperature peaks, which may occur when the device is removed from the skin for a short time due to the absence of a thermal load, can be effectively prevented. For example, in known state-of-the-art devices without corresponding contact sensors, it can be observed that some subjects trigger the heating simultaneously with applying the device or even somewhat prematurely. Since there is no thermal load on the treatment surface during this phase, the temperature can exceed the predetermined value. As a result, a painful sensation already at the start occurs. Similar undesirable effects can occur if the devices are removed from the skin or lip only for a short time during the treatment and then applied again.

Such overshooting can be effectively prevented based on information provided by a contact sensor. A heating phase, for example, can be suppressed preferably as long as the contact sensor does not confirm a skin contact. If the treatment is already in progress, an immediate correction can be made based on the information provided by the contact sensor in the event of a short-term loss of contact. For this purpose, the control device can be configured, for example, in such a way that in the event of a confirmation of a contact (and thus a thermal load), a higher heating output is provided than in case of no contact associated with a low thermal load.

The use of a contact sensor opens up a wide range of possibilities for an especially targeted and precise control of the contact temperature or the overall temperature course of the treatment device.

The use of a contact sensor constitutes therefore a particular advantage for the treatment of herpes diseases in which a particularly precise control of the temperature course is necessary for a successful therapy. As explained above, in particular for the treatment of Herpes *labialis*, the contact temperature must be as high as possible in order to reduce replication of the herpes viruses. On the other hand, the skin area is particularly sensitive, so that the subjects discontinue a treatment even if the defined treatment surface is slightly exceeded.

In a preferred embodiment, the control device is configured such that the time period of the treatment phase is determined depending on when contact of the treatment surface with the skin is determined. By controlling the duration of the treatment phase as a function of the contact with the skin, a much more precise heat transfer can be achieved. If, for example, heating has started and a contact with the skin is not detected until a later point in time, the treatment phase can be extended. This ensures that the desired and therapeutically effective heat transfer takes place. Such regulation can achieve repeatable results and effectively compensates for improper use of the device.

In further preferred embodiment of the invention, the device is characterized in that the control device is configured such that heating of the heating element is only initialized if a contact of the treatment surface with the skin is determined or a heating of the heating element is interrupted as soon as it is determined that no contact of the treatment surface with the skin is present.

This can prevent the device from heating up, for example by accidentally actuating a switch during transport. Also, unnecessary reheating, although the user has knowingly or unknowingly stopped the treatment, is avoided. This saves energy and protects against improper use.

In a preferred embodiment of the invention, the device is characterized in that the contact sensor is or comprises an optical detector. In the sense of the invention, an optical detector preferably refers to a sensor for electromagnetic radiation, preferably in the visible range, i.e. in a wavelength range of 400-700 nm. An optical detector for the visible range is preferably referred to as a light sensor. However, it is also possible that the optical detector detects electromagnetic radiation in the infrared or ultraviolet range. Various optical detectors such as photocells, photomultipliers, CMOS sensors, CCD sensors, photodiodes, phototransistors or photo resistors are suitable for the purpose of the device.

A common feature of these detectors relates to their ability to detect changes in the intensity of incident electromagnetic radiation, which can usually be passed on to a control device in the form of an electrical signal. The optical detector is preferably installed within the treatment surface or in the immediate vicinity of the treatment surface. Thus, when applying the device and the treatment surface to a skin, the optical detector is at least partially, preferably completely, covered by the skin area. This leads to a change in the measured light intensity. Based on the measured data on the change in light intensity, the control device can detect the presence of a contact with the skin. For this purpose, the control device may also include reference data such as average ambient light intensities or thresholds below which the optical detector is at least partially or fully covered.

The embodiment is characterized by a simple, yet reliable implementation of a contact sensor, which addition is only associated with low additional costs.

In further preferred embodiment of the invention, the device is characterized in that the contact sensor is or comprises a capacitive sensor. In the sense of the invention, a capacitive sensor preferably refers to a sensor which detects the change in the electrical capacitance of one or more capacitors. The capacitive sensor is preferably installed within the treatment surface. As soon as the treatment surface contacts a human skin area or lip, the measured capacity changes due to the coupling of the foreign capacity. A capacitive sensor can therefore reliably indicate the contacting of a skin area.

In further preferred embodiment of the invention, the device is characterized in that the contact sensor is or comprises a tactile sensor. A tactile sensor is preferably understood to be a sensor which can detect a contacting of the treatment surface on a mechanical basis. The measuring principle is therefore preferably based on the fact that when the treatment surface is placed on the skin, a pressure is transmitted which can be detected mechanically by means of the tactile sensor. The person skilled in the art is familiar with various suitable tactile sensors, for example these can include measuring springs or piezoelectric elements, which detect an indentation or displacement of the entire treatment surface.

In further preferred embodiment of the invention, the device is characterized in that the contact sensor is or comprises a pyrometer. In the sense of the invention, a pyrometer is a sensor for a non-contact temperature measurement. The non-contact temperature measurement is preferably based on the measurement of heat radiation, which is emitted by each body as a function of its temperature. The pyrometer can therefore also be described as a radiation thermometer or infrared sensor. The determination of the temperature of a body depends on its emissivity. The emissivity is to be understood as the ratio of the radiated power of any body to the radiated power of a black body at the same temperature. The emissivity depends on the material. It can also change for certain materials with the wavelength, temperature or other physical quantities.

In preferred embodiments, the pyrometer or infrared radiator is embedded with an offset in the treatment surface such that the temperature of objects located in front of the treatment surface or contacting the treatment surface can be measured. If a temperature is determined which typically corresponds to the surface temperature of a skin, preferably a lip, a contact of the skin can be determined based upon the measured data of the pyrometer. The temperature ranges most suitable for this are approx. 28° C.-34° C., preferably approx. 30° C.-33° C. Suitable wavelength ranges for measuring these temperature ranges are in the mid-infrared range, preferably between 3 μm and 20 μm. The person skilled in the art is aware of different pyrometers, which are suitable for the purpose described herein. In particular, the person skilled in the art can also rely on established technologies for non-contact temperature measurements, which are used in non-contact medical thermometers.

In further preferred embodiment of the invention, the device is characterized in that the control device is able to determine whether the treatment surface is in contact with the skin on the basis of a correlation of the measurement data of the temperature sensor and data on the operation of the heating element. In this embodiment, the contact sensor is formed by a temperature sensor and a control device for controlling the heating elements. The contact measurement is based on the knowledge that the electrical current required to reach or maintain a temperature depends on whether the treatment surface contacts a thermal load (e.g. a skin). If the treatment surface is heated up during a skin contact, a heat transfer takes place, which must be compensated by an increased energy supply to the heating elements. By evaluating the current and actual temperature curve, reliable statements can be made as to whether the treatment surface contacts a skin. Reference data may preferably be provided to the control device for this purpose.

On one hand, the embodiment is characterized by the fact that no separate optical or capacitive sensor is necessary to detect a contact. Instead, components that the device comprises for a temperature monitoring can be adapted to detect a contact with the skin.

In addition, a special advantage of this embodiment that it enables a very precise distinction between an actually desired contact with a skin and an accidental contact of the treatment surface with other materials (e.g. the inner fabric of a trouser pocket). The skin (like other materials) has a specific thermal fingerprint, which enables by means of the aforementioned configuration of a contact sensor the detection of the presence of a contact with a skin with a particular high confidence It is also possible to detect a contact for specific skin areas on the basis of such a contact determination. For example, the lip can transmit a different thermal load than it is the case for other parts of the skin. Depending on the presence of a contact with a certain part of the skin, it is therefore possible to optimize or adjust the contact temperature within slightly varying limits.

In a preferred embodiment of the invention, the control device includes reference data on a correlation of the temperature of the treatment surface with the control of the at least one heating element in case that the treatment surface is in contact with the skin or with air. The reference data can, for example, include conditions from the measured temperature and the power supply required to this end. Preferably, the reference data include such conditions for a temperature curve, so that the measurement of the current ratio of temperature and power supply can be used to determine very precisely, whether the treatment surface contacts a skin. Advantageously, such a regulation can be used to reliably distinguish not only a contact with the skin compared to air, but also a contact with a skin compared to any materials with other thermal properties.

In a further preferred embodiment, the reference data may include the average quantity of heat delivered to the skin or air. The reference data may contain correlations between a contact temperature and a heat output. Reference data for different parts of the skin, for example the lip or the face, can also be recorded in preferred embodiments in order either to obtain a particularly meaningful average value or, as explained above, in order to optimize the course of treatment depending on the type of skin contact detected.

In further preferred embodiment, the device comprises a waterproof housing. The housing is preferably an outer casing of the device, so that it encloses in particular the control device and other electronic components. It is preferred for the housing to have a housing head and a housing handle, wherein the treatment surface is preferably at a lower portion of the housing head. For controlling and managing the temperature of the treatment surface, the housing preferably has a cutout at the appropriate position. In the preferred embodiment, the housing is designed such that that all cutouts, e.g. also any battery compartments that may be present, are watertight. For example, seals or suitable gaskets, possibly made of elastomers, may be used for this purpose. However, the person skilled in the art is familiar with numerous other technical possibilities for designing a waterproof housing. The waterproof design of the housing represents an additional safety element, since in this way damage to the control device or other electronic components due to infiltrating liquids can be effectively avoided. In addition, the waterproof housing results in the avoidance of corrosion and thus to an extended useful life of the device. Safety can be increased synergistically, especially in connection with the use of protective lacquer. This is particularly important for disinfection processes of the device and especially of the treatment surface. Thus, the device can be disinfected very easily and faultlessly by immersing the whole device in a disinfectant liquid and keeping it there for a certain minimum time.

In other preferred embodiments, the device includes additional safety elements that control the temperature of the treatment surface.

For one, the device may preferably include a hardware-implemented temperature monitor which limits the maximum temperature of the treatment surface to a value between 54° C. and 58° C., preferably about 56° C. The temperature of the treatment surface may also be limited to a value between 54° C. and 58° C. The hardware-implemented temperature monitor allows advantageously to ensure that a maximum temperature does not exceed a value between 54° C. and 58° C., preferably of approx. 56° C. The "hardware-implemented temperature monitor" preferentially refers to a temperature control system for the treatment surface, which can shut off the power supply of the heating elements for the treatment surface based on hardware. In particular, the "hardware-implemented temperature monitor" preferentially allows to cut the power supply to the heating elements when the maximum temperature is exceeded, independently of the regulation of the heating elements by the control device, e.g. the microprocessor. If, for example, a firmware is installed on the control device to regulate the heating elements, it is preferred that the hardware-implemented temperature monitor reliably limits the maximum temperature of the treatment surface, even in case of failure or incorrect performance of the firmware.

Other suitable maximum temperatures, e.g. between 43° C. and 47° C., may also be preferred.

In a preferred embodiment of the invention, the maximum temperature is selected from a range of 47° C. and 58° C. Intermediate ranges from the aforementioned ranges can also be preferred, such as 47° C.-48° C., 48° C.-49° C., 49° C.-50° C., 50° C.-51° C., 51° C.-52° C. , 52° C.-53° C., 53° C.-54° C., 54° C.-55° C., 55° C.-56° C., 56° C.-57° C. or even 57° C.-58° C. A person skilled in the art recognizes that the above ranges can also be combined to obtain other preferred ranges for the maximum temperature, such as 47° C. to 50° C., 50° C. to 54° C., or 48° C. to 52° C.

Herein, simple means can be used to ensure that the treatment surface of the device does not exceed a maximum temperature. Even in the event of a failure in the control device, e.g. after an infiltration of liquids, the hardware-based temperature monitor can advantageously ensure at all times that the treatment surface does not exceed a maximum temperature of between 47° C. and 58° C., preferably 54° C. and 58° C., preferably approximately 56° C. This additional technical element for a temperature monitoring makes it possible to maintain an excellent safety standard without interfering with the operation of the hyperthermal treatment device.

Since a contact sensor can effectively prevent thermal overshooting with a functioning control device. It is further possible to use maximum values for the hardware-implemented temperature monitor which are particularly low or particularly close to the desired treatment surface.

In the case of a desired contact temperature from 43° C. to 47° C., for example, it may be preferable to specify a maximum temperature between 48° C. and 54° C., preferably between 50° C. and 54° C. Without a contact sensor, the temperature ranges can be briefly reached in the event of a loss of contact or the associated loss of a thermal load. As described above, a contact sensor can be used to prevent such overshooting. Conversely, this means that when using a contact sensor, exceeding the desired temperature range already indicates with a high probability a malfunction of the firmware, which justifies intervention by the temperature monitor.

As an additional safety element, the device may comprise a safety fuse which, in the case of a short-circuit in the device or uncontrolled continuous heating of the device, interrupts the power supply to the device. In the meaning according to the invention, a safety fuse preferably defined as an excessive current protective mechanism in which an electrical circuit can be interrupted, for example by the melting of a fuse element as soon as the strength of the current exceeds a limiting value for a time to be determined. It is preferred for the safety fuse to be located in the device between the input of the supply voltage into the device and the device itself. If a malfunction should occur that is characterize by the flow of an uncontrolled high current from the supply voltage feed into the device, the safety fuse will advantageously shut down the power supply to the device completely. A safety fuse offers sufficiently fast, and on the other hand, extremely reliable protection.

It has been found that even with faultless design of the device and the supplying of a hardware-implemented temperature monitor it is not possible to rule out the occurrence of continuous heating of the heating elements in extremely rare instances because of incorrect operation. Continuous heating of the heating elements in the meaning of the invention preferably means that the temperature of the heating element rises uncontrolled, i.e., without temperature-based regulation with the aid of the control device. If during such breakdowns the hardware-implemented temperature monitor fails, the treatment surface can rise uncontrollably to temperatures far above the desired contact temperature, for example to temperatures far in excess of 65° C.

Although such undesirable continuous heating occurs extremely rarely, it can cause severe injuries to the subjects. This is especially due to the fact that the skin parts to be treated with hyperthermia, such as lips, are usually particularly sensitive and, for example, are characterized by redness, swelling or even wound formation. A temperature distinctly elevated above 65° can lead to severe local pain at these sites and can cause burns to the skin.

The safety fuse described is especially advantageous for being able to guarantee that the heating of the treatment surface will be switched off even in the most unlikely instance of a malfunction. For example with the aid of the safety fuse, independently of any temperature measurement, excessive heating of the treatment surface, due for example to defective temperature sensors, can be suppressed. It was recognized that the power supply to the device represents a central regulatory interface that meets the highest safety requirements. By integration of the safety fuse into the current flow for supplying the device it is possible to ensure that a maximum supply current will not be exceeded for a certain time. Since continuous heating and uncontrolled heating of the heating elements above the desired temperature are related to increased current flow, in this way overheating of the treatment surface can be avoided especially reliably. In particular, the current controller can react very quickly before the current is present for long enough that it will produce a temperature corresponding to its strength.

The combined use of a hardware-implemented temperature monitor and a fuse is particularly advantageous.

For example, one drawback of the safety fuse is that following the single triggering it permanently disconnects the supply voltage from the device. Resumption of the use of the device following triggering of the safety fuse requires repair by a technician, for example replacement of the safety fuse. In terms of cost, the device has generally become unusable when the fuse has been triggered.

Advantageously, however, the hardware-implemented temperature monitor is set such that it does not need to cause permanent shutoff of the power supply to the device. Instead, the hardware-implemented temperature monitor is designed in such a way that if the temperature of the treatment surface exceeds a maximum temperature, the power supply to the heating elements is interrupted during the time period exceedance. Thus the current interruption by the hardware-implemented temperature monitor is advantageously reversible, i.e., as soon as the temperature of the treatment surface again drops below the maximum temperature, the heating elements can heat again.

Thus even after a one-time occurrence of a malfunction the normal use of the device can be continued. The user would also not notice the malfunction, since as a result of the maximum temperature selection, the effectiveness and the independence of the temperature controller, no temperatures perceived by the user as unpleasant will develop and once a malfunction has occurred, the device can function perfectly again upon the next use.

The combination of the safety features of a hardware-implemented temperature monitor with a safety fuse allows for surprisingly reliable control of the temperature by the most economical means possible because of the hierarchy of safety barriers.

In a preferred embodiment of the invention, the hardware-implemented temperature monitor comprises at least a second temperature sensor for measuring the temperature of the treatment surface and a comparator, wherein the comparator compares the temperature of the treatment surface with the maximum temperature and, if the maximum temperature is exceeded, stops the current feed to the at least one heating element. In the sense of the invention, a comparator preferentially refers to an electronic circuit for comparing two voltages, whereby the output indicates in binary form which of the two voltages is higher. In the prior art, various comparators are sufficiently well known, which are suitable for using two analog voltages to output one binary output signal and indicating which of the input voltages is higher. The Schmitt trigger may be mentioned as an example of a comparator circuit. It is preferred for a reference value for a voltage be applied to one input of the comparator using a voltage splitter. This reference value preferably corresponds to the voltage value that the second temperature sensor would show if the temperature of the treatment surface is equal to the maximum temperature. At the second input of the comparator, the output voltage of the temperature sensor, which depends on the temperature of the treatment surface, is preferably present. A particularly preferred temperature sensor has an NTC thermistor, i.e., a thermal resistor. This has a negative temperature coefficient, so that when the temperature increases, the resistance decreases and a higher current flows. However, posistors, i.e., PTC thermistors, having a positive temperature coefficient, may also be used, so that when the temperature increases, the resistance increases and a lower current flows.

If the temperature of the treatment surface increases, the voltage value at the comparator, regulated by the second temperature sensor, moves toward the voltage reference value that corresponds to the maximum temperature. As soon as the temperature exceeds the maximum temperature, the output signal on the comparator changes in a binary manner. The comparator is preferably integrated in the power supply of the heating elements. In other words, before the temperature of the treatment surface reaches the maximum temperature, the comparator preferably unblocks the supply voltage of the heating elements. However, as soon as the temperature is higher than the maximum temperature, the outlet of the comparator shuts off and interrupts the power supply to the heating elements. When the temperature of the treatment surface drops again, supply voltage is advantageously unblocked again by the comparator. As a result, reversible on and off switching of the heating elements can only take place for the time period during which the temperature of the treatment surface exceeds the maximum temperature. In addition, it may be preferred for the comparator to be unlocked by the control device when the device is turned on. Thus if correct start-up of the device does not take place, the comparator is configured in the setup phase such that the current feed of the heating elements is interrupted.

The preferred embodiment of the hardware-implemented temperature monitor described has proven in tests to be especially robust and reliable. Because of the reversibility of the safety switch and the simple design, the preferred embodiment is also characterized by low manufacturing and maintenance costs.

Due to the design independent of the control device and to the dedicated temperature sensor, reliable operation can be guaranteed even in the case of failure of a component of the control device.

In addition, a hardware-implemented temperature monitor in the described form using a comparator is especially rapid, since comparators are widely used electronic components which are distinguished by their reliability as well as their rapid switching capacity. Thus, for example, comparators with switching times of nanoseconds or less are available.

In a preferred embodiment of the invention, the device is characterized in that the safety fuse has a threshold value for a maximum current which corresponds to the heating of the treatment surface to a value of between 65° C. and 70° C., preferably of 65° C. for 1 second. Tests have shown that only a temperature increase to above 65° C. for more than 1 second is highly critical for the pain sensation and can cause damage to skin parts. Advantageously, by setting the safety fuse for these parameter values, the safety fuse will not be triggered prematurely in the case of noncritical temperature elevations of the treatment surface. In this way it is possible to increase the economic efficiency without compromising on safety. The person skilled in the art knows, based on the electrical parameters of the heating elements, which safety fuse should be selected to guarantee the indicated values. For this purpose, the current flow may be measured while simultaneously measuring the temperature of the treatment surface. In addition it is particularly preferred to use a fast-acting safety fuse, which preferably reacts to a current increase within less than 20 ms. Thus it was recognized that even a short-term increase in the current for less than 20 ms can lead to a temperature elevation for more than 1 second because of the thermal inertia of the treatment surface.

Compared with non-resettable, purely temperature-dependent thermal fuses, which likewise function by melting, the current-dependent safety fuse used here has several advantages. In the case of non-resettable, purely temperature-dependent thermal fuses, the melting does not take place upon application of a current above a threshold value, but only upon application of an external temperature that is higher than a defined maximum temperature. Thus in contrast to non-resettable, purely temperature-dependent thermal fuses, current-dependent safety fuses can react even before a certain undesirable temperature is reached as a result of an elevated current acting for a relatively long period. Likewise, non-resettable, purely temperature-dependent thermal fuses always require a certain reaction time in the presence of an external temperature above a defined maximum temperature. In this way, dangerous further temperature elevations can occur. In contrast to this, current-dependent safety fuses react more quickly and with minimal system-related latency times.

In a preferred embodiment of the invention, the device is characterized in that the threshold value of the safety fuse is preferably between 1 A and 2.5 A, particularly preferably approximately 2 A. Tests have shown that with regard to the preferred heating elements, the threshold values mentioned guarantee with especially good reliability that the temperature of the treatment surface will exceed a temperature of 65° C. to 70° C. for no more than 1 second. Thus, it is possible to ensure by the melting of the safety fuse above 1 A to 2.5 A that the temperature of the treatment surface cannot enter a range that is hazardous to health. Thus in the case of a normal treatment, a normal treatment current that is less than 2.5 A, preferably 1 A occurs. If a malfunction occurs, e.g., in case of continuous heating, an increased current will flow. In this case, the fuse intervenes and effectively prevents uncontrolled heating.

It may also be preferable to use only one of the safety elements selected from hardware-implemented temperature monitors and/or safety fuses. In this way, a particularly simple structure can be implemented, whereby an acceptable level of safety is achieved.

In further preferred embodiment of the invention, the device is characterized in that the device comprises a power supply unit and a voltage monitor which monitors the voltage of the power supply unit. In the sense of the invention, the power supply unit preferably provides the electrical energy to operate the device. Preferred power supply units are regular batteries or rechargeable batteries. These usually supply the electrical energy by providing a DC voltage. In the preferred embodiment, the voltage provided by the power supply unit is monitored by a voltage monitor. In the sense of the invention, a voltage monitor preferentially refers to an electrical circuit that can measure the voltage of the power supply unit and triggers an action if it falls below a predetermined limit value. In the prior art a number of variants for voltage monitors are known, wherein the person skilled in the art knows which voltage monitor is suitable for which types of power supply units, i.e. in particular batteries or rechargeable batteries. It is preferred that if the voltage monitor detects a drop in the voltage of the power supply unit below a certain value, it transmits an interrupt request (IRQ) to the control device, which is preferably a microprocessor. If a treatment cycle, i.e. a heating phase or treatment phase, is in operation during this time, the interrupt request causes the treatment cycle to be aborted. This represents a further safety mechanism. It was recognized that an insufficient voltage at the power supply unit can cause failure of the control device, e.g. the microprocessor. In this case it may occur that the temperature regulation of the contact temperature by means of the control device is carried out incorrectly and uncontrolled heating of the treatment surface occurs. The voltage monitor may additionally contribute to increasing the safety of the device and to avoiding a health hazard in the event of a defective battery, for example.

In a preferred embodiment of the invention, the device is characterized in that the device comprises a data memory for storing the system data and/or error messages. Preferred system data includes a treatment cycle counter, which preferably count the use of different types of treatment cycles separately. For example, if a shorter or a longer treatment cycle can be selected, this will be counted separately. Furthermore, the system data preferably comprises a boot counter, i.e. a counter for how often the device was started up, as well as information on the error messages with current error status.

Preferably the following error messages can be stored: "Reset" indicates that the voltage monitor has triggered a reset. "Watchdog" indicates that a watchdog reset has occurred in the firmware, i.e. a system restart due to a software error. It is further preferred that for an error reporting the program mode is determined in which the apparatus was operating when the error occurred. "Temperature too high" may indicate that the temperature measured at the temperature sensor is too high or that the temperature sensor is defective. A "temperature too low" may indicate that the temperature measured at the temperature sensor is too low or that the temperature sensor is defective. "Contact temperature reached" may indicate whether the desired contact temperature has been reached or an error has occurred during the preheating phase.

Advantageously, the stored system data and error messages can be used for diagnosis and troubleshooting of the device. For example, these data can be read out when a customer sends in a defective device. Based on the data it is possible to correlate the error that occurred, e.g. "Temperature too high", with further system data on the number of treatment cycles or watchdog resets. Based on these data therefore it is possible to continuously optimize the safety features of the device during the development phase and afterwards. The ability of the device to store system data and error messages allows continuous improvement of the hardware and software components of the device based on meaningful data.

In a further preferred embodiment, the device is characterized in that firmware is installed on the control device which at least controls the temperature regulation of the treatment surface, wherein the firmware comprises a watchdog counter (WDC) that monitors whether the firmware is executed. In the sense of the invention, firmware is preferably understood as software, i.e. the instructions for a computer-implemented process, which is embedded in the control device, preferably in the microprocessor. In other words, the firmware preferably comprises the software that is functionally linked with the hardware of the device, i.e., especially with the heating elements and temperature sensors. Preferably, the firmware is executed when the device is started and takes over the monitoring and control function of these hardware components of the device. Thus, the control device evaluates the measured data of the temperature sensors as well as user inputs preferably on the basis of the firmware in order to control the power supply for the heating elements during the treatment cycle. In the sense of the invention, hardware-implemented components are preferably components, the function of which is assured independently of correct execution of the firmware. As described above, the temperature monitor is hardware-implemented so that its function, i.e. a limitation of the maximum temperature, can take place independently of a correct execution of the firmware on the control device. Even in the event of a system failure of the firmware, the hardware-implemented temperature monitor therefore can quickly and correctly limit the maximum temperature of the treatment surface.

In the particularly preferred embodiment, the firmware of the control device is monitored with the aid of a hardware-implemented watchdog counter. Especially preferred is a time-out watchdog. The time-out watchdog is preferably activated by the firmware before the start of the treatment phase. During the treatment phase, the firmware will send a signal to the time-out-watchdog within a predetermined time interval to reset it. If the time-out watchdog is not reset, this will preferably lead to restarting the firmware. The time interval is preferably based on the time projected for carrying out a temperature measurement and regulation of the heating elements by the firmware and can, for example, amount to between 2 ms and 10 ms.

Such a time-out watchdog can advantageously ensure that at least during the treatment phase of the device the firmware functions correctly and the temperature of the treatment surface is monitored. By using a hardware-implemented watchdog for monitoring the firmware, preferably for example with the aid of a time-out watchdog, it is thus possible to make sure that if the firmware does not function correctly and the predetermined time interval is not maintained, the treatment phase will be interrupted. Thus, a further safety feature of the device is available in addition to those mentioned above, which, especially in combination with the hardware-implemented temperature monitor, ensures that overheating of the treatment surface is ruled out even if the firmware is not functioning correctly.

The invention claimed is:

1. A device for treating a herpes disease on skin of a lip or other skin, comprising:
   at least one treatment surface with a maximum size of 60 mm$^2$; and
   a control device for regulating the temperature of the treatment surface, the control device being configured to regulate the treatment surface on an outer side facing the skin by heating at least one heating element in a heating phase to a contact temperature of 43° C.-47° C. during a contact of the treatment surface with the skin, and maintain the contact temperature in a treatment phase for a time period between 1 and 10 seconds wherein the contact temperature refers to the temperature which the treatment surface exhibits on an outer side facing the skin, while the outer side is in contact with the skin area, wherein the treatment surface is formed by a gold or ceramic layer and the contact temperature is determined by:
   a temperature sensor integrated within or present on the inner side of the treatment surface;
   wherein the temperature sensor measures a temperature and the control device is configured to determine the contact temperature at the outside of the treatment surface based upon the temperature measured by the temperature sensor by further taking into account a heat flow within the treatment surface, wherein the difference between the temperature measured by the temperature sensor and the contact temperature is provided to the control device based upon theoretical predictions about the heat flow within the treatment surface, when in contact with the skin, or based upon calibration measurements as reference data:
   wherein the temperature measured by the temperature sensor is higher than the contact temperature, and
   wherein the control device is configured to set a target temperature on the inner side of the treatment surface in a feedback regulation of the heating to a higher temperature than the desired contact temperature on the outer side of the treatment surface during the contact based upon said difference between the temperature measured by the temperature sensor and the contact temperature.

2. The device according to claim 1, wherein the heating phase is 1 second to 5 seconds.

3. The device according to claim 2, wherein the heating phase is 1 second to 2 seconds.

4. The device according to claim 1, wherein the contact temperature is between 44.5° C.-46.5° C.

5. The device according to claim 4, wherein the contact temperature is between 45° C.-46° C.

6. The device according to claim 1, wherein the size of the treatment surface is between 30 mm$^2$ and 50 mm$^2$.

7. The device according to claim 1, wherein:
   the size of the treatment surface is between 30 mm$^2$ and 50 mm$^2$,
   the contact temperature is between 44.5° C.-46.5° C., and the control device is configured to maintain the contact temperature for a time period of between 2 and 5 seconds.

8. The device according to claim 1, further comprising:
   at least one temperature sensor for measuring the temperature of the treatment sur-face during contact with the skin, wherein the control device regulates the at least one heating element based on the measurement data of the temperature sensor.

9. The device according to claim 1, wherein:
   the temperature sensor is present on the inner side of the treatment surface;
   the treatment surface is formed by a ceramic layer having a layer thickness of between 50 μm and 2000 μm or
   the treatment surface is formed by a gold layer having a layer thickness of between 50 μm and 2000 μm.

10. The device according to claim 9, wherein:
    the temperature sensor is present on the inner side of the treatment surface;
    the treatment surface is formed by the ceramic layer or by the gold layer having a layer thickness of between 50 μm and 1000 μm.

11. The device according to claim 1, wherein the device comprises at least one contact sensor.

12. The device according to claim 11, wherein the at least one contact sensor is one of an optical detector, a capacitive sensor, a tactile sensor and a pyrometer.

13. The device according to claim 12, wherein:
    the temperature sensor is present on the inner side of the treatment surface;
    the treatment surface is formed by the ceramic layer or by the gold layer having a layer thickness of between 50 μm and 500 μm.

14. The device according to claim 1, wherein the control device is able to determine whether the treatment surface is in contact with the skin on the basis of a correlation of the measurement data of the temperature sensor and data on the operation of the heating element.

15. The device according to claim 14, wherein the control device comprises reference data on a correlation of the temperature of the treatment surface with the control of the heating element in the case that the treatment surface is in contact with the skin or with air.

16. The device according to claim 1, wherein the control device is configured such that the time period of the treatment phase is determined as a function of when a contact of the treatment surface with the skin is determined.

17. The device according to claim 1, wherein:
    the control device is configured such that a heating of the heating element is only initialized if a contact of the treatment surface with the skin is determined; or
    the control device is configured such that a heating of the heating element is interrupted as soon as it is determined that no contact of the treatment surface with the skin is present.

18. The device according to claim 1 further comprising:
    a waterproof housing.

19. The device according to claim 1, wherein:
a hardware-implemented temperature monitor limits a maximum temperature of the treatment surface to a value between 54° C. and 58° C., and/or
a safety fuse shuts off the device in the event of a short circuit or uncontrolled continuous cheating.

\* \* \* \* \*